(12) United States Patent
Noiseux-Boucher

(10) Patent No.: US 11,401,052 B2
(45) Date of Patent: Aug. 2, 2022

(54) HIGH-VISIBILITY IMPACT DETECTION SYSTEM AND METHOD OF PREPARING THE SAME

(71) Applicant: Bell Helicopter Textron Inc., Fort Worth, TX (US)

(72) Inventor: Guillaume Noiseux-Boucher, Mirabel (CA)

(73) Assignee: Textron Innovations Inc., Providence, RI (US)

( * ) Notice: Subject to any disclaimer, the term of this patent is extended or adjusted under 35 U.S.C. 154(b) by 868 days.

(21) Appl. No.: 16/138,865

(22) Filed: Sep. 21, 2018

(65) Prior Publication Data

US 2020/0094994 A1    Mar. 26, 2020

(51) Int. Cl.
*B64C 1/12*    (2006.01)
*B64F 5/60*    (2017.01)
*G01N 21/88*   (2006.01)
*B64C 27/00*   (2006.01)

(52) U.S. Cl.
CPC .............. *B64F 5/60* (2017.01); *B64C 1/12* (2013.01); *B64C 27/006* (2013.01); *G01N 21/8803* (2013.01)

(58) Field of Classification Search
CPC .......... B64F 5/60; B64G 1/56; B64C 27/007; B64C 27/006
See application file for complete search history.

(56) References Cited

U.S. PATENT DOCUMENTS

| | | | | |
|---|---|---|---|---|
| 3,896,758 A * | 7/1975 | Di Battista | ............. | G01W 1/00 116/201 |
| 4,917,938 A * | 4/1990 | Mohan | ................... | B29C 70/08 428/215 |
| 9,233,765 B2 * | 1/2016 | Gibson | ................... | G07C 5/08 |
| 10,871,405 B2 * | 12/2020 | Vahey | ....................... | G01J 5/58 |
| 10,935,447 B2 * | 3/2021 | Takemoto | ............... | B32B 27/36 |
| 2016/0167811 A1 * | 6/2016 | Gordon | .................. | B32B 27/08 244/171.7 |

* cited by examiner

*Primary Examiner* — Brian M O'Hara
(74) *Attorney, Agent, or Firm* — Lightfoot & Alford PLLC

(57) ABSTRACT

A component equipped with a high-visibility impact detection system. The component includes a composite layer with a minimum impact energy level known to potentially cause damage to the composite layer, a high-visibility layer covering at least a portion of the composite layer, and a top layer covering the high-visibility layer. The top layer is configured to fracture, and expose the high-visibility layer, when subjected to an impact energy level greater than or equal to the minimum impact energy level known to potentially cause damage to the composite layer.

18 Claims, 3 Drawing Sheets

HIGH-VISIBILITY IMPACT DETECTION SYSTEM AND METHOD OF PREPARING THE SAME

BACKGROUND

Composite components provide a very high strength-to-weight ratio. As such, aerospace engineers continue to increasingly utilize composite components in an effort to maximize weight savings, and therefore, increase aircraft performance and efficiency. However, composite components are not without some drawbacks. For example, some composite components can suffer internal structural damage from an impact without showing any visible damage, hereinafter referred to as Non-Visible Impact Damage ("NVID"). Composite components may also suffer internal structural damage with very little visible surface damage, sometimes referred to as Barely Visible Impact Damage ("BVID"). Accordingly, NVID may go completely undetected and BVID may go undetected until an inspection identifies the visible damage. Because the internal structural damage associated with NVID and BVID could possibly cause failure while an aircraft is in flight, regulating bodies may require aircraft manufacturers to certify that an aircraft will remain operable even if a composite component of the aircraft suffers an impact that will result in NVID or BVID. In order to satisfy this requirement, the first step is determining the potential real-world impact threats for each component (e.g., a tool drop from a certain height, hail impact, etc.). Once the threat assessment has been conducted, it must be translated into an impact energy level. In parallel with the threat assessment, an impact survey is conducted to determine the minimum amount of impact energy required to cause BVID. If the threat energy is higher than the required energy to create BVID, the BVID energy will be used as the maximum threshold. In the event the threat energy is lower than the energy for creating BVID, the BVID will be used and will cover the lower energy threat impact. The next step for the composite components is to undergo required structural testing with a simulated NVID and/or BVID to verify a damaged composite component will not fail during operation of the aircraft. These tests are extensive and costly, and a failure of the composite component can jeopardize the certification of the aircraft. In order to meet the certification requirements, the composite components may have to be structurally reinforced to survive NVID and/or BVID caused by potential impact threats. This additional structural reinforcement may significantly increase the weight and expense of each composite component. Having a system that allows easy detection of lower impact damage (thus reducing the BVID threshold) would be greatly beneficial.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a high-visibility impact detection system and method for preparing the same. In order to solve the dilemma presented by NVID and/or BVID to a composite component, the high-visibility impact detection system includes a top layer configured to fracture, and expose a high-visibility layer, when subjected to an impact energy level greater than or equal to an energy level known to potentially cause NVID to the composite component thus reducing the possibility that NVID and/or BVID will go undetected. As such, composite components equipped with the high-visibility impact detection system may not require additional structural reinforcement to ensure safe operation following an impact because the possibility of internal damage going undetected is significantly reduced. And, therefore, the aircraft will not be inadvertently operated when NVID and/or BVID exists.

Figure 1:
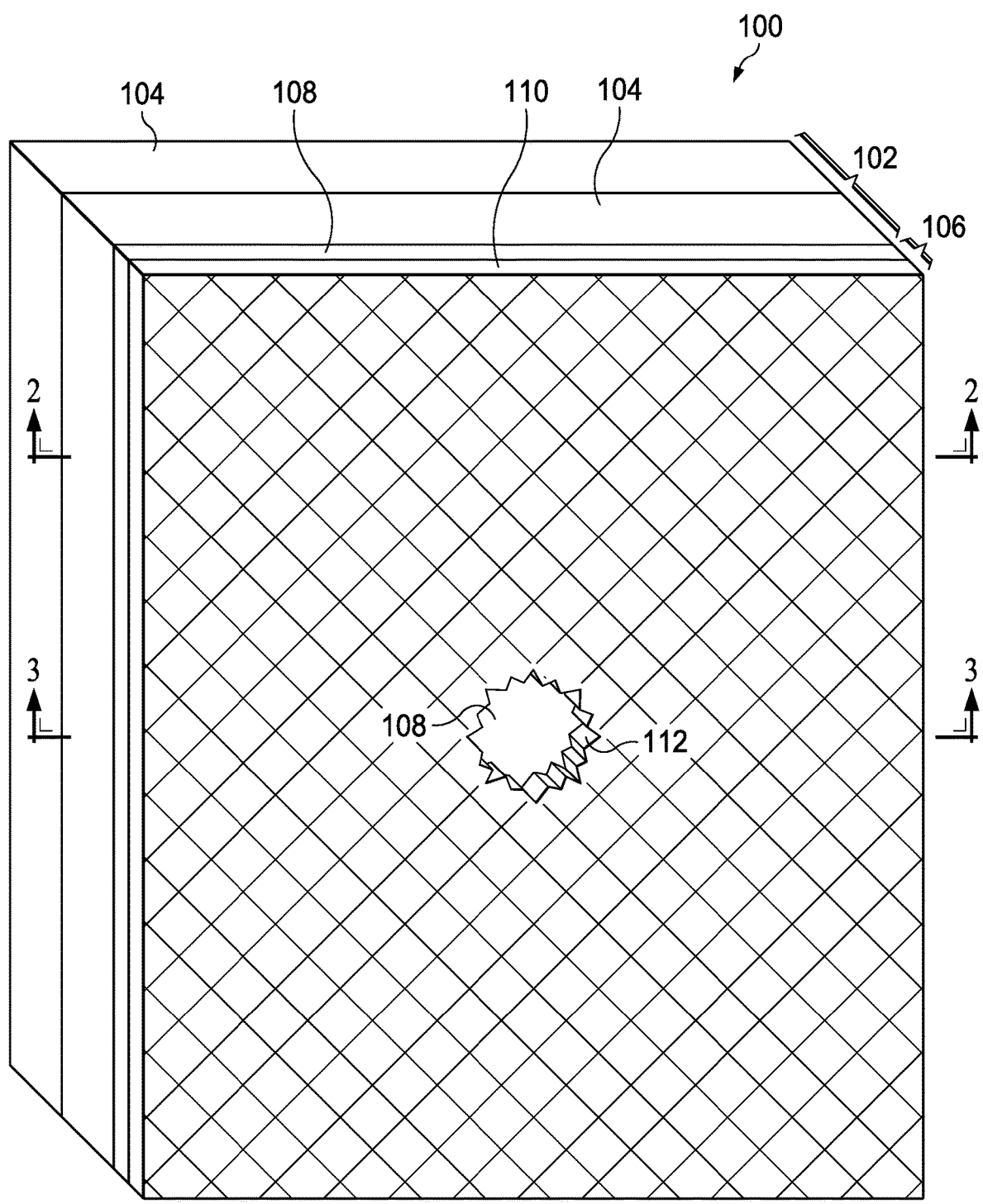
FIG. 1 is an oblique view of a composite component including a high-visibility impact detection system, according to this disclosure.
Figure 2:
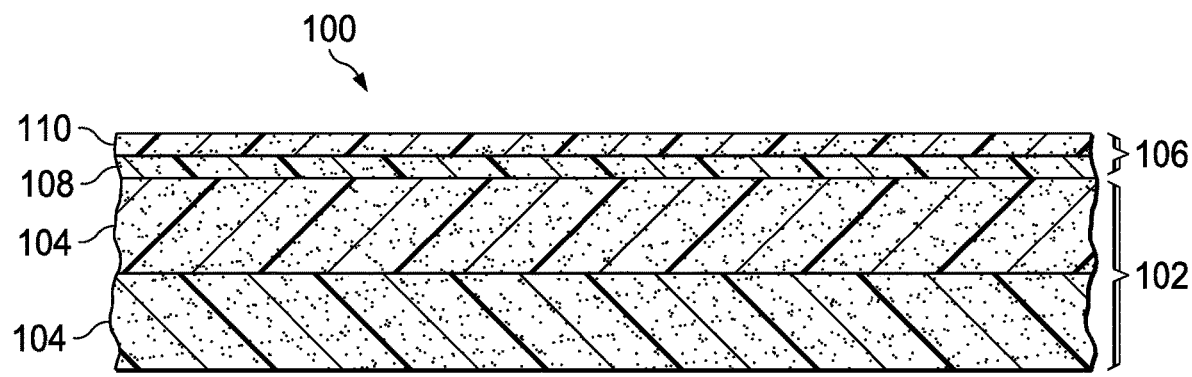
FIG. 2 is a cross-sectional side view of the composite component of FIG. 1, showing no impact damage.
Figure 3:
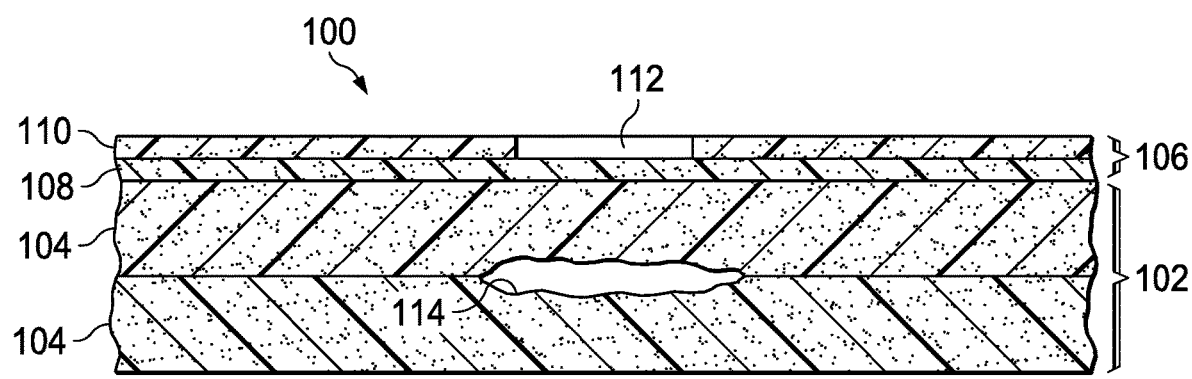
FIG. 3 is a cross-sectional side view of the composite component of FIG. 1, showing impact damage.

Referring to FIGS. 1-3, a composite component 100 is illustrated. Composite component 100 includes a composite layer 102 comprising one or more plies 104 of a fiber reinforced resin composite material, such as carbon fiber, Kevlar, fiberglass, etc., and may also include internal support structures such as those found in sandwich panels. A high-visibility detection system 106 covers at least a portion of composite layer 102. High-visibility detection system 106 includes a high-visibility layer 108 covering at least a portion of composite layer 102 and a top layer 110 covering high-visibility layer 108.

High-visibility detection system 106 is designed to provide easily identifiable locations were an impact has occurred that may have damaged composite layer 102. This is accomplished by configuring top layer 110 to rupture (e.g., fracture, peel, bubble, etc.), and expose high-visibility layer 108, when subjected to an impact energy level greater than or equal to a minimum impact energy level known to potentially cause damage to composite layer 102. FIGS. 1 and 3 illustrate the function of high-visibility detection system 106 after composite component 100 is subjected to an impact having an energy level greater than or equal to an impact energy level known to potentially cause damage to composite layer 102. The impact causes a perforation 112 in top layer 110, exposing high-visibility layer 108 below. The exposure of high-visibility layer 108 through perforation 112 should alert a user that an impact has occurred and composite component 100 should be inspected for possible internal damage. At which point, the user would discover damage 114, illustrated as a separation of plies (i.e., delamination) 114, that would have otherwise gone undetected.

In order to ensure the portion of high-visibility layer 108 exposed through perforation 112 is noticed by the user, high-visibility layer 108 should preferably be a color that highly contrasts with the color of top layer 110. As such, the high-visibility layer 108 may comprise a fluorescent paint, film, or other coating substance. It is also important that high-visibility layer 108 be more durable than top layer 110 to ensure that perforation 112 does not extend through high-visibility layer 108. Top layer 110 may comprise a film, a paint, or any other coating substance that is more brittle than high-visibility layer 108. Another means of detectability may include high-visibility layer 108 being configured to deform (e.g., bubble, ripple, etc.) in response to an impact, wherein the deformation of high-visibility layer 108 causes top layer 110 to show the deformation on the surface, thereby by creating easily detectable visual signs without top layer 110 perforating.

Before high-visibility detection system 106 can be applied to composite layer 102, testing must be performed on test coupons representative of composite layer 102. The testing includes determining a minimum, or threshold, impact energy level that may cause damage to composite layer 102. This may be accomplished by impacting the test coupons representative of composite layer 102 with known forces and performing non-destructive inspections of the test coupons for NVID and/or BVID. This testing could be performed, for example, by dropping known masses from known heights onto various portions of the test samples. And increasing the mass and/or height until damage results. Non-destructive inspection of the test coupons may include visual, x-ray, ultrasound, and/or any other means of detecting internal damage. Once the minimum impact energy level that may cause damage to composite layer 102 is known, it must be utilized to determine the type, and thickness, of a substance to be used as top layer 110. Determining the appropriate top layer 110 substance and thickness may be accomplished by utilizing the same testing techniques for determining the minimum impact energy threshold of the test coupons. If, during the testing process, it is determined that different portions of composite layer 102 have different minimum impact energy levels, it may be beneficial to vary the thickness of top layer 110 to correspond to the appropriate minimum impact energy level for the different portions of composite layer 102. Alternatively, it may be desirable to utilize a different substance for top layer 110 to correspond to the different minimum impact energy levels of the different portions of composite layer 102.

The known minimum impact energy levels should also be utilized to determine a substance, and thickness thereof, to utilize for high-visibility layer 108. As it is important to verify that high-visibility layer 108 will withstand impact energy levels all the way up to an impact energy level that causes visible damage to composite layer 102.

During the testing process, it may also be determined that certain impact energy levels may cause NVID or BVID, but that the NVID or BVID caused at that impact energy level is not likely to cause a catastrophic failure, but a larger impact energy level may cause a different type of NVID or BVID this is likely to cause a catastrophic failure. In this situation, a second high-visibility layer (not shown) may be applied between high-visibility layer 108 and composite layer 102. Wherein high-visibility layer 108 is configured to perforate when subjected to the larger impact energy level, exposing the second high-visibility layer, which has a contrasting color to that of high-visibility layer 108 and top layer 110. In this configuration, perforation 112 of top layer 110, exposing high-visibility layer 108, notifies the user of impact damage, but that the impact damage does not require emergency repair. Whereas exposure of the second high-visibility layer notifies the user that the impact damage requires immediate attention.

After determining the minimum impact energy level that may cause damage to composite layer 102, high-visibility layer 108 is applied to at least a portion of composite layer 102. High-visibility layer 108 may be applied to cover all of composite layer 102, but only needs to be applied to portions of composite layer 102 that will be visible to the user when composite component 100 is in use. After high-visibility layer 108 is applied, top layer 110 is applied over the entirety of high-visibility layer 108.

Figure 4:
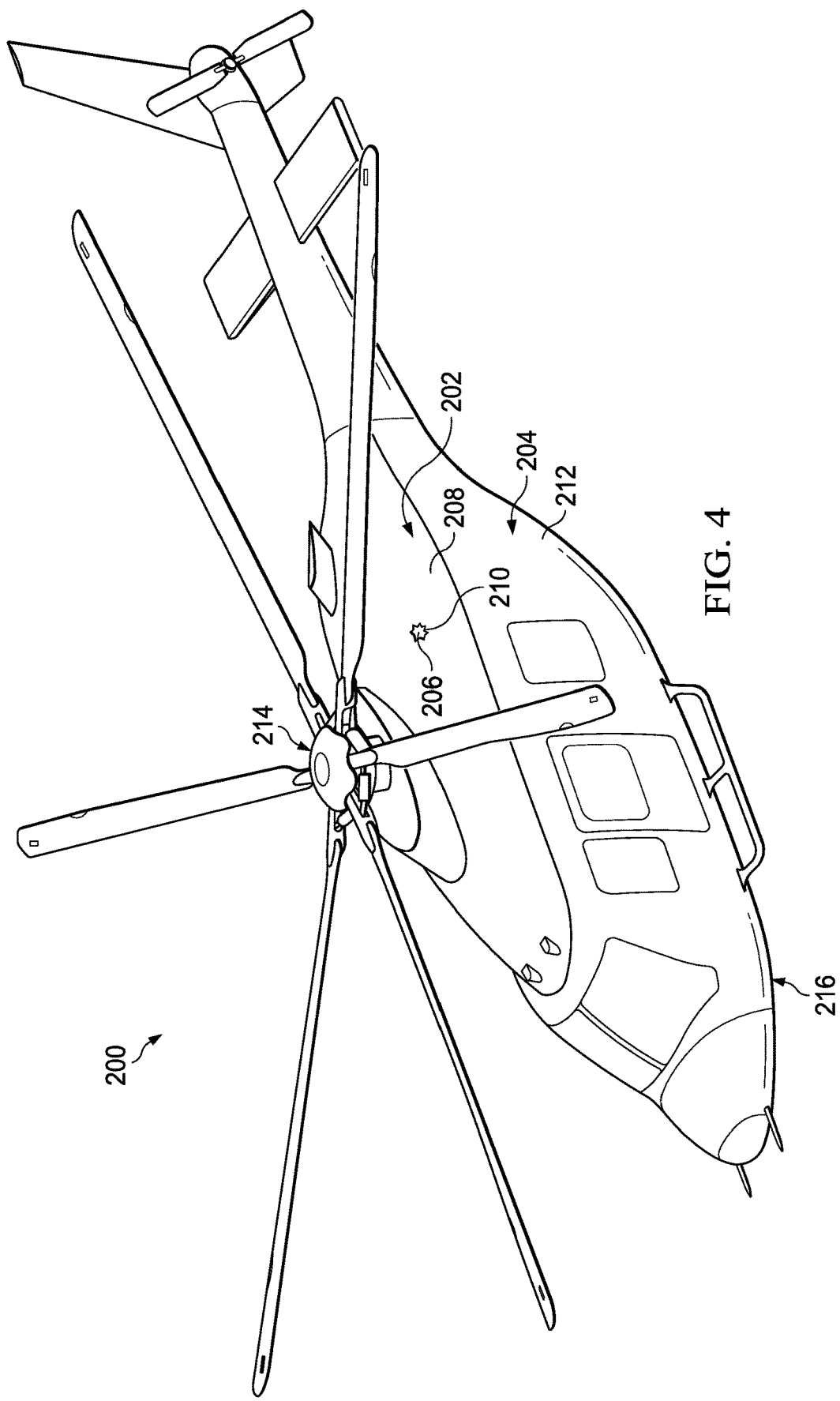
FIG. 4 is an oblique view of an aircraft including two composite panels with high-visibility impact detection systems.

FIG. 4 illustrates an example of an aircraft, illustrated as a rotorcraft 200, comprising a first composite panel 202 and a second composite panel 204, both comprising high-visibility impact detection systems similar to high-visibility detection system 106. First composite panel 202 is covered with a first high-visibility layer 206 and then a first top layer 208. First high-visibility layer 206 is visible through a perforation 210 caused by an impact having an impact energy level greater than or equal to a minimum energy level known to potentially cause damage to first composite panel 202. Second composite panel 204 comprises a second high-visibility layer (not shown) covered by a second top layer 212. On rotorcraft 200, first composite panel 202 is a generally horizontal surface under a rotor assembly 214, while second composite panel 204 is a generally vertical surface on a side of a fuselage 216. Because of its location, first composite panel 202 is subjected to particle impacts from the rotor wash and it is also likely to encounter impacts during routine maintenance of rotor assembly 214. Accordingly, first composite panel 202 is built to withstand greater impacts than second composite panel 204. Therefore, first composite panel 202 has a greater minimum impact energy level than second composite panel 204. Thus, first top layer 208 may have a greater thickness than second top layer 212. Alternatively, first top layer 208 may comprise a more durable substance than second top layer 212.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-$ R$_l$), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A component equipped with a high-visibility impact detection system, comprising:
   a composite layer having a minimum impact energy level known to potentially cause damage to the composite layer;
   a high-visibility layer covering at least a portion of the composite layer; and
   a top layer covering the high-visibility layer, the top layer being configured to rupture, and expose the high-visibility layer, when subjected to an impact energy level greater than or equal to the minimum impact energy level;
   wherein the top layer is more brittle than the high-visibility layer.

2. The component of claim 1, wherein the high-visibility layer comprises a color that contrasts with a color of the top layer.

3. The component of claim 2, wherein the high-visibility layer comprises one of a film or a paint.

4. The component of claim 2, wherein the top layer comprises one of a film or a paint.

5. The component of claim 2, further comprising:
   a second high-visibility layer between the high-visibility layer and the composite layer, the second high-visibility layer having a different color than the high-visibility layer;
   wherein the high-visibility layer is configured to fracture, and expose the second high-visibility layer, when subjected to a predetermined impact energy level.

6. The component of claim 2, wherein a thickness or a composition of the top layer varies based on the composite layer having different minimum impact energy levels known to potentially cause damage to the composite layer in different locations.

7. A method of equipping a composite layer with a high-visibility impact detection system, the method comprising:
   determining a minimum impact energy that may potentially cause damage to the composite layer;
   applying a high-visibility substance to at least a portion of the composite layer;
   determining a top-layer substance and a thickness of the top-layer substance that will rupture when subjected to the minimum impact energy; and
   applying the top-layer substance over the high-visibility substance;
   wherein the top-layer substance is more brittle than the high-visibility substance.

8. The method of claim 7, wherein the determining the minimum impact energy comprises:
   impacting a test coupon composite layer with known forces and inspecting the test coupon composite layer for damage.

9. The method of claim 8, wherein the impacting the test sample composite layer comprises:
   dropping known masses from known heights.

10. The method of claim 8, wherein the high-visibility substance comprises one of a film or a paint.

11. The method of claim 10, wherein the top-layer substance comprises one of a film or a paint.

12. The method of claim 7, wherein the determining the minimum impact energy comprises:
   determining if the minimum impact energy that will cause damage to the composite layer is different in different portions of the composite layer.

13. The method of claim 12, further comprising:
   varying the thickness and/or composition of the top-layer substance on the different portions of the composite layer.

14. An aircraft, comprising:
   a first composite panel having a minimum impact energy level known to potentially cause damage to the first composite panel;
   a first high-visibility layer covering at least a portion of the first composite panel;
   a first top layer covering the first high-visibility layer, the first top layer being configured to rupture, and expose the first high-visibility layer, when subjected to an impact energy level greater than or equal to the minimum impact energy level; and
   a second composite panel having a minimum impact energy level known to potentially cause damage to the second composite panel;
   a second high-visibility layer covering at least a portion of the second composite panel; and
   a second top layer covering the second high-visibility layer, the second top layer being configured to rupture, and expose the second high-visibility layer, when subjected to an impact energy level greater than or equal to the minimum impact energy level known to potentially cause damage to the second composite panel.

15. The aircraft of claim 14, wherein the minimum impact energy level known to potentially cause damage to the first composite panel is greater than the minimum impact energy level known to potentially cause damage to the second composite panel, and a thickness of the first top layer is greater than a thickness of the second top layer.

16. The aircraft of claim 15, wherein the first high-visibility layer and the second high-visibility layer comprise one of a film or a paint.

17. The aircraft of claim 16, wherein the first top layer and the second top layer comprise one of a film or a paint.

18. The aircraft of claim 17, wherein the aircraft is a rotorcraft.

* * * * *